UNITED STATES PATENT OFFICE.

HUGH H. COLQUITT, OF ATLANTA, GEORGIA.

FERTILIZER.

SPECIFICATION forming part of Letters Patent No. 346,024, dated July 20, 1886.

Application filed June 25, 1886. Serial No. 206,259. (No specimens.)

*To all whom it may concern:*

Be it known that I, HUGH H. COLQUITT, a citizen of the United States, residing at Atlanta, in the county of Fulton and State of Georgia, have invented certain new and useful Improvements in Fertilizers; and I do hereby declare the following to be a full, clear, and exact description of the invention, such as will enable others skilled in the art to which it appertains to make and use the same.

My invention consists in the combination and mixing of bone phosphate of lime with the kernels or hearts of raw cotton-seed. The bone phosphate may be obtained from all the sources known to science ground to a meal or flour, and used either in this form or treated with sulphuric acid, producing phosphoric acid, and mixed with the kernels of the raw cotton-seed. The bone phosphate can be used from ground animal-bone, ground phosphatic rock, or any substance known to science that yields chemically phosphoric acid combined with a base. The combination of the heart or kernel of the raw cotton-seed, which shows on analysis a good percentage of ammonia, as well as a small percentage of phosphoric acid and potash, with the large percentage of phosphoric acid in bone, phosphate rock, Canada apatite, and similar animal and mineral productions, will produce a fertilizer good for any land or any crop. When combined with dissolved bone, acidulated rock, or animal-bone or phosphate deposits ground and treated with sulphuric acid or similar agency, there will be produced a high-grade concentrated plant-food. The kernels of the raw seed yield a fine percentage of ammonia and a small percentage of phosphoric acid and potash, all of which elements are valuable as plant-food. In addition, the vegetable matter in the raw kernels is good for the land. The hulls, which are taken from the seed, produce excellent fuel, and the ash of the hulls contains a large percentage of potash, which potash so produced is a valuable constituent that may be used to great advantage.

My experiments have demonstrated that phosphoric acid in the forms above stated, mixed with the kernels of the seed in almost any proportions, varying with the conditions, will produce a valuable fertilizer, and also that the ash of the hulls, if added, will be valuable, while almost any proportions will make a good fertilizer. I particularly recommend the following formulæ:

No. 1. Acidulated South Carolina rock, one thousand to fifteen hundred pounds; kernels of seed, (whole or ground,) five hundred to one thousand pounds.

No. 2. Acidulated rock or dissolved bone, one thousand to thirteen hundred pounds; kernels of seed, (whole or ground,) five hundred to nine hundred pounds; ash of hulls, two hundred to three hundred pounds.

These formulæ may be varied by the addition of other forms of potash and ammonia, always bearing in mind that the kernels of the cotton-seed and the ash of the hulls are the prime factors of this invention in the combination with phosphoric acid. The ash of the hulls has been used as potash in fertilizers, as also the whole cotton-seed; but I know no instance in which the kernels of the seed have been used as proposed in this application. These other additions are not claimed in this application. My invention makes the cotton-seed far more valuable. Hulling or decorticating the seed takes off the hard fibrous covering or coat that contains only a small percentage of valuable fertilizing properties, and renders easily available and in more concentrated form the heart or kernel of the seed, and in combination with the best forms of phosphoric acid will make a good and cheap fertilizer, as herein stated.

What I claim, and desire to secure by Letters Patent of the United States, is—

The herein-described composition of matter to be used as a fertilizer, which consists of the raw kernels of cotton-seed combined with phosphorite rock or phosphate of lime, as and for the purpose described.

In testimony whereof I affix my signature in presence of two witnesses.

HUGH H. COLQUITT.

Witnesses:
C. FRED. KELLER,
C. S. WHITMAN.